United States Patent

Chang et al.

[11] Patent Number: 4,483,378
[45] Date of Patent: Nov. 20, 1984

[54] FEEDING DEVICE OF WOOD WORKING MACHINE

[76] Inventors: James Chang; Jen-Wen Chang; Kai-Jou Chang; Horng-Tswen Chang, all of No. 68, Chung-Cheng Rd., Fong-Yun, Taichung District, Taiwan

[21] Appl. No.: 484,318

[22] Filed: Apr. 12, 1983

[51] Int. Cl.³ .................... B27B 25/00; B27C 1/12
[52] U.S. Cl. .................... 144/246 E; 144/246 R; 144/136 R; 198/782; 198/722; 198/723; 226/183; 226/174
[58] Field of Search .......... 144/246 R, 246 E, 134 R, 144/136 R, 117 R; 83/436, 431; 198/782, 723, 722; 226/183, 188, 190, 174, 176, 177

[56] References Cited

U.S. PATENT DOCUMENTS 3,186,455  6/1965  Stoll .................... 144/246 R

FOREIGN PATENT DOCUMENTS 112746  8/1980  Japan .................... 144/246 R

Primary Examiner—Leon Gilden
Assistant Examiner—Jorji M. Griffin
Attorney, Agent, or Firm—Oblon, Fisher, Spivak, McClelland & Maier

[57] ABSTRACT

A feeding device used for a wood working machine includes two roller assemblies respectively mounted to two roller supports which can be controlled to turn about horizontal axes and which in turn is supported by an upper portion mounted to a cantilever arm of a column. Each of roller assemblies includes at least two rows of rollers respectively mounted on at least two horizontal axes. By adjusting roller supports, these rollers can roll on a curve surface.

1 Claim, 11 Drawing Figures

FEEDING DEVICE OF WOOD WORKING MACHINE

BACKGROUND OF THE INVENTION

This invention relates to a feeding device, particularly to a feeding device for wood working machines, such as, milling machine, planing machine, sawing machine, etc., which is used to feed a workpiece on a work table by rolling action to a cutter.

It is known that, feeding devices used for wood working machines include a set of rollers mounted to a roller support which is associated with a motor and is held by an overarm mounted to a colum at a certain height. In such feeding device, although the rollers can be changed to various positions or angles by adjusting the roller support which is steerable to turn about a vertical axis, these rollers are not suitable to work on curve surfaces, especially when the number of rows of rollers are increased for feeding large workpiece. Additionally, the mounting of these rollers can not allow the cutter to work at the position between them and therefore, in some cases, such feeding device can not guide and feed the workpiece in a balanced manner.

SUMMARY OF THE INVENTION

An object of the invention is to provide a feeding device which can be applied to various operations and various forms of workpiece.

Another object of the invention is to provide a feeding device which has two roller supports steerable to turn about both vertical and horizontal axes so that the rollers mounted to the supports can roll on a curve surface and guide the workpiece in a balanced manner.

According to the present invention, a feeding device used for a wood working machine comprises, a column, a cantilever arm, a head including, an upper portion mounted to the cantilever arm and steerable to turn about a vertical axis relative to the cantilever arm, and two arm portions symmetrically extended from the lower side of the upper portion and steerable to turn about first horizontal axes relative to the upper portion, two sets of roller assemblies respectively mounted to the arm portions. Each of the roller assemblies includes, a roller support connected to the arm portion and steerable to turn relative to the arm portion about a second horizontal axis perpendicular to the first horizontal axis, and at least two rows of rollers attached to the support and respectively rotatable about two third horizontal axes parallel to the second axis. The second and third axes are arranged at locations of apexes of a triangle, the second axis being positioned above the third axes and distances of the third axes from the second axis are unequal. The upper portion, arm portions and the supports including cooperable transmission means for transmitting rotational movements to the rollers. A power means for providing a drive force is mounted to the cantilever arm.

These and other objects, features and advantages of the present invention will be more apparent in the following description of a preferred embodiment with reference to the accompanying drawings, in which:

DETAILED DESCRIPTION OF THE PREFERRED EMBODIMENT

Figure 1:
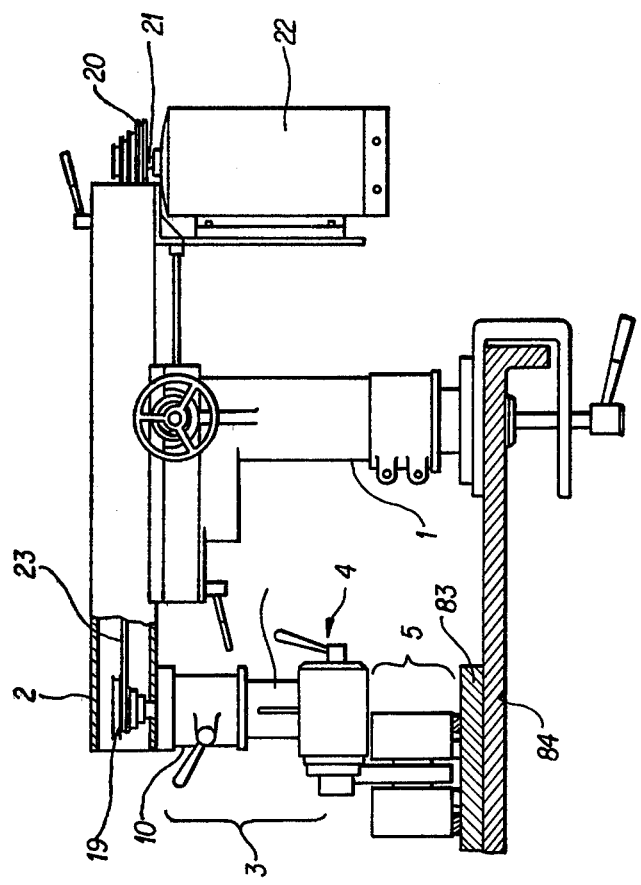
FIG. 1 is a schematic view of a feeding device constructed according to the invention.
Figure 2:
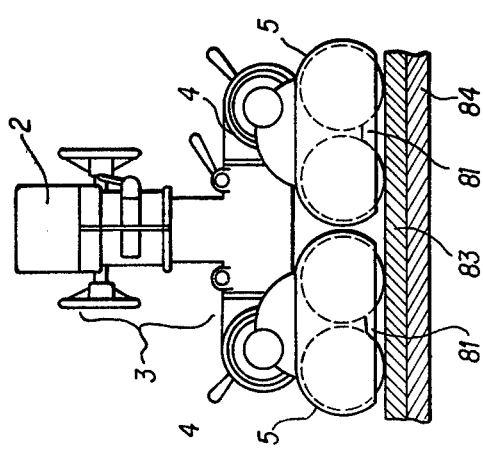
FIG. 2 shows a schematic view of the feeding device in another position.
Figure 3:
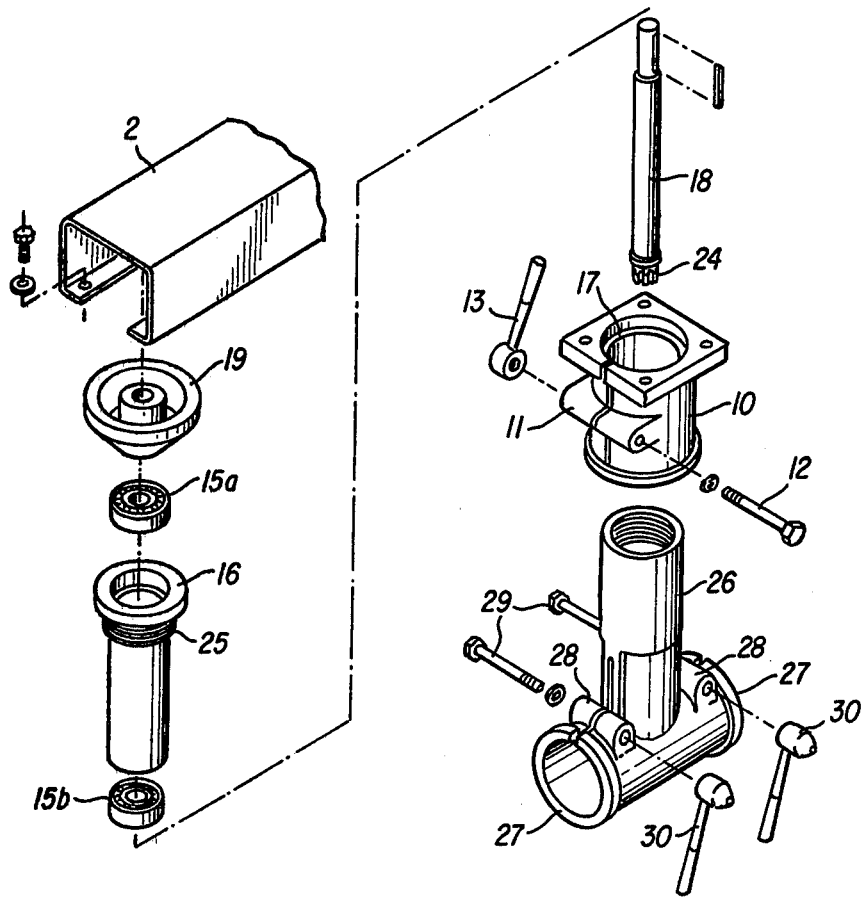
FIG. 3 is an exploded view of the upper portion.

Referring to FIGS. 1 and 2, there is shown a feeding device 1 constructed according to the invention which includes a column 1, a cantilever arm 2, a head constituted of an upper portion 3 and two arm portions 4, and two roller assemblies 5. As shown in FIGS. 1 and 3 the upper portion 3 includes a tubular clamp coupling 10 which has a lug 11, a clamping screw 12 and a clamping handle 13 and is mounted to the head 2 by means of screws. A shaft sleeve 14 in which is mounted a bearing assembly 15a and 15b has a flange 16 that is seated on a shoulder 17 of the clamp coupling 10. A shaft 18 is journalled in the bearing assembly 15a and 15b, and to the upper end of the shaft 18 is attached a pulley member 19 which is connected to another pulley 20 mounted to a power take-off shaft 21 of a drive means 22, such as, motor, by means of transmission belt 23. At the lower end of the shaft 18 is provided a bevel gear 24. The shaft sleeve 14 has a threaded portion 25 through which a T-shaped shell 26 is coupled thereto. The T-shaped tubular shell 26 thereby is rotatable, relative to the clamp coupling 10 or the cantilever arm 2, about a vertical axis, and can be locked against movement by operating the clamping handle 13. At the lower side of the T-shaped shell 26 are two clamping members 27 each of which includes a lug 28, a clamping screw rod 29 and a clamping handle 30.

Figure 4:
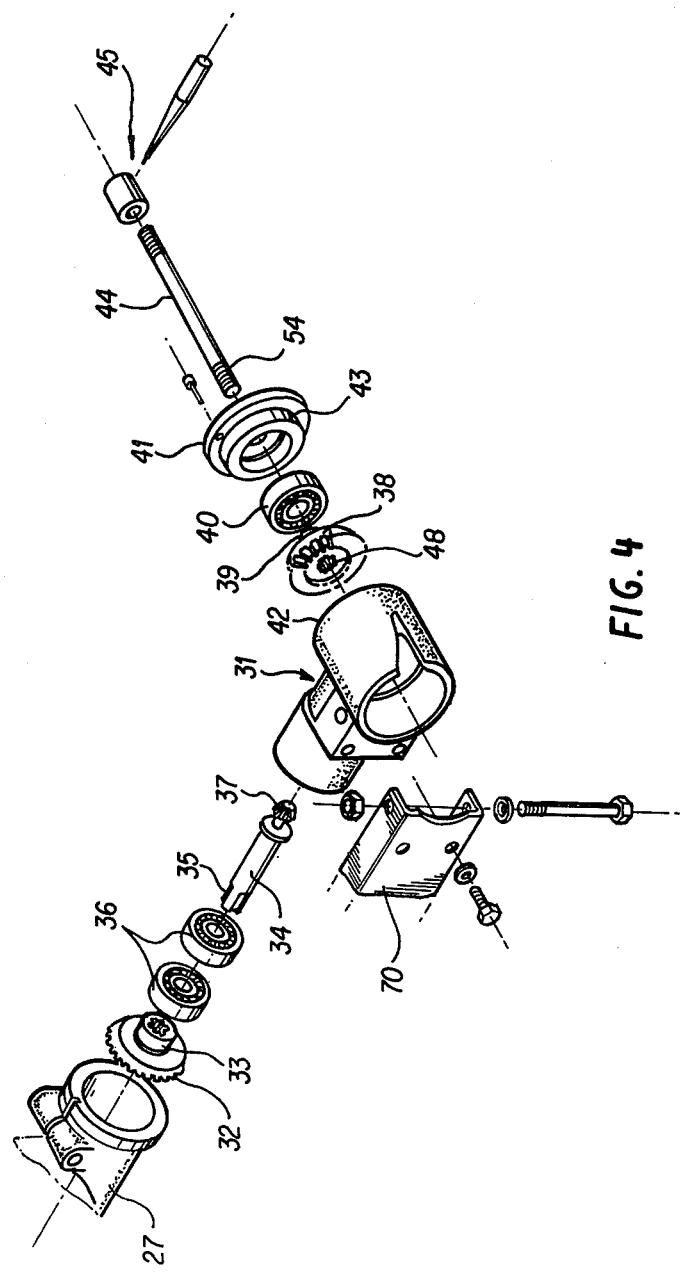
FIG. 4 is an exploded view of an arm portion.

These clamping members 27 respectively clamp two symmetrical arm portions 4 each of which includes a bent tubular shell 31, as shown in FIG. 4. Tne T-shaped shell 26 is in communication with these bent tubular shells 31 and the bevel gear 24 of the shaft 18 is engaged with two bevel gears 32 adapted to transmit the movement to two horizontal shafts 34 which are oppositely extended to two bent shells 31. As the arm portions are the same construction, the constructions thereof will be explained with reference to one arm portion 4. Each of the gears 32 has a small diameter body 33 and is fixedly mounted on the shaft 34 through key ways 35. Two bearings 36 are sleeved onto the shaft 34 in the bent tubular shell 31 as better shown in FIG. 6. A bevel gear 37 is provided at the end of the shaft 34 and is made to engage with another bevel gear 38 which has a small diameter body 39 on which is mounted a bearing member 40. A cap 41 is provided for covering an open end 42 of the bent shell 31 and has an annular member 43 sleeved on the bearing 40. A tightening screw rod 44 is inserted through the gear 38, bearing 40 and the cap 41 and is provided with a guide handle 45. A hollow shaft 46 (FIG. 5) is sleeved onto the screw rod 44 and has key ways 47 engaged with the teeth 48 of the gear 38. A bearing assemblies 49 and a bearing shim 50 are mounted on the hollow shaft 46 and a spur gear 51 is provided at the end of the shaft 46 which is extended into a coupling member 52 which is used to couple a roller support 53 of the roller assembly 5 with the bent shell 31. The coupling member 52 has a shell having a conical surface which is in slide contact with the inner wall of the bent shell 31 and the threaded end 54 of the screw rod 44 is screwed in the threaded hole 55 of the coupling 52 for locking of the movement coupling 52 relative to the shell 31. The bent shells 31 are rotatable, relative to the T-shaped tubular shell 26, about horizontal shafts 34 and can be locked against movement by operating the clamping handles 30. A coupling channel 70 is attached to two bent shells 31 across the upper portion 3 so that the two bent shells 31 can be turned at the same time and same direction.

Figure 5:
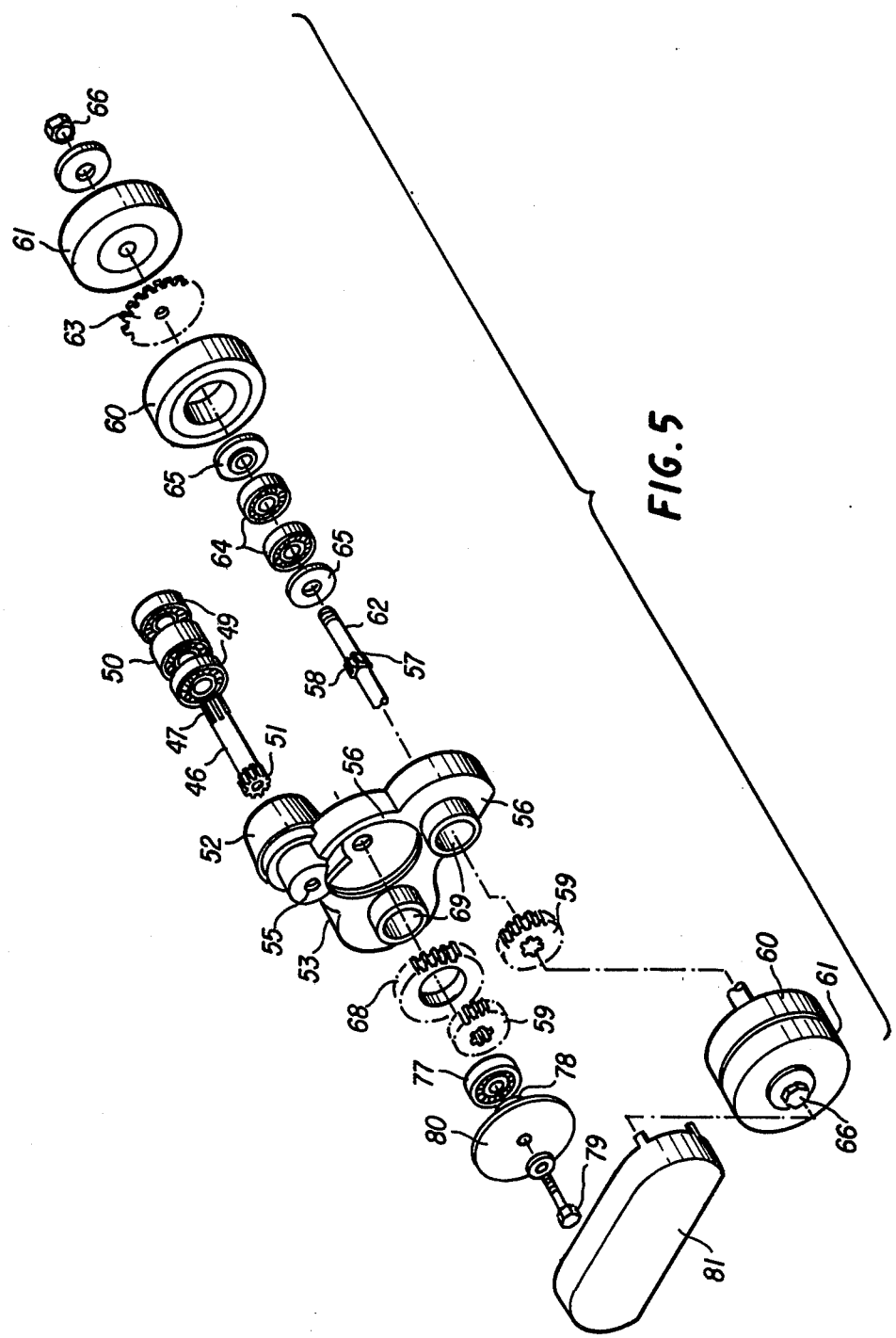
FIG. 5 is an exploded view of one roller assemblies.
Figure 6:
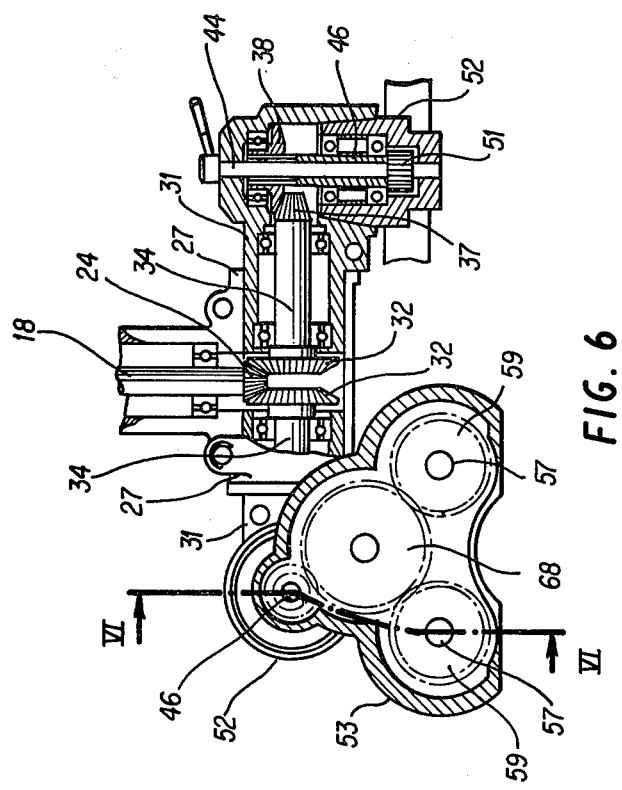
FIG. 6 is a fragmentary sectioned view of the feeding device.
Figure 7:
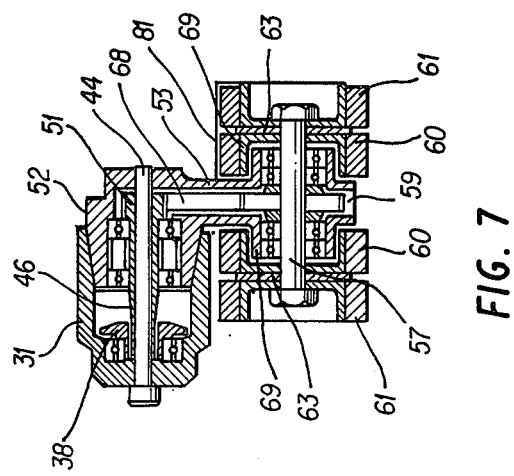
FIG. 7 is another fragmentary sectioned view of the feeding device.

Referring to FIG. 5, each of the roller supports 53 of the roller assemblies 5 which are connected to the arm portions 4 is in the form of a housing integrally formed with the coupling member 52 and is rotatable relative to the bent shell 31 about a horizontal shaft 46 perpendicular to the shaft 34 of the bent shell 31. The support 53 can be locked against movement by operating the tightening screw rod 44. There are further provided annular seats 69, below the coupling member 52, at two opposite walls 56 of the housing or support 53. Two axes 57 of rotation pass through the opposite walls 56 in coaxial positions relative to the annular seats 69, and in parallel positions relative to the axis of rotation of the roller support 53, as shown in FIGS. 5, 6 and 7 (FIG. 5 only shows one axis 57 and one set of elements which are mounted to said axis for easy illustration). The axis 57 is provided with a spur gear 58 which is engaged with a further gear 59 received in the housing 53. Four rollers 60 and 61 are mounted on the axis 57 in a symmetrical position in respect of the location of the gear 59 as better seen in FIG. 7. The rollers 61 are engagedly mounted on the axis 57 by means of key ways 62. Between each two rollers 60 and 61 are a friction gear 63 and the rollers 60 are rotatably sleeved onto the annular seat 69. Two bearings 64 and bearing shims 65 are provided in the annular seat 69. Two threaded ends 67 of the axis 57 are respectively engaged with screws 66 for restraining the rollers 60 and 61.

There is further provided a gear 68 which is supported by a bearing 77 sleeved onto a hub 78 that is attached to the wall 56 of the housing by means of a bolt 79. A collar 80 is provided on the hub 78 for covering the gear 68. The gear 68 is engaged with the gears 51 and 59 and the rotation movement of the shaft 46 is transmitted to the axes 57 through the gear 68 for rolling the rollers 60 and 61. Two covers 81 are provided at both sides of the housing 53 in one roller assembly 5.

Figure 8B:
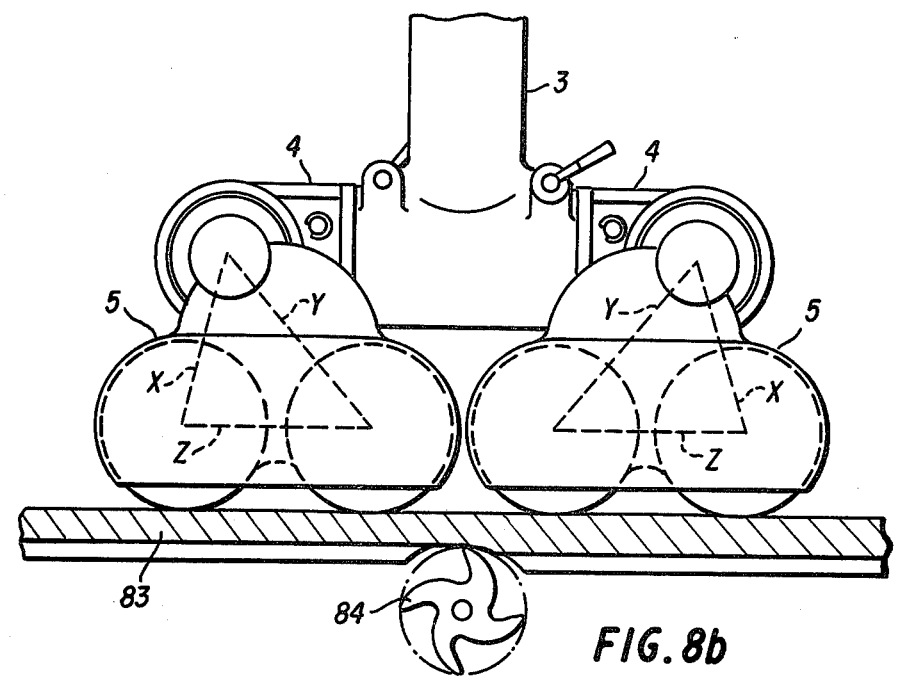
FIG. 8 illustrates an operating position of the feeding device.
Figure 8A:
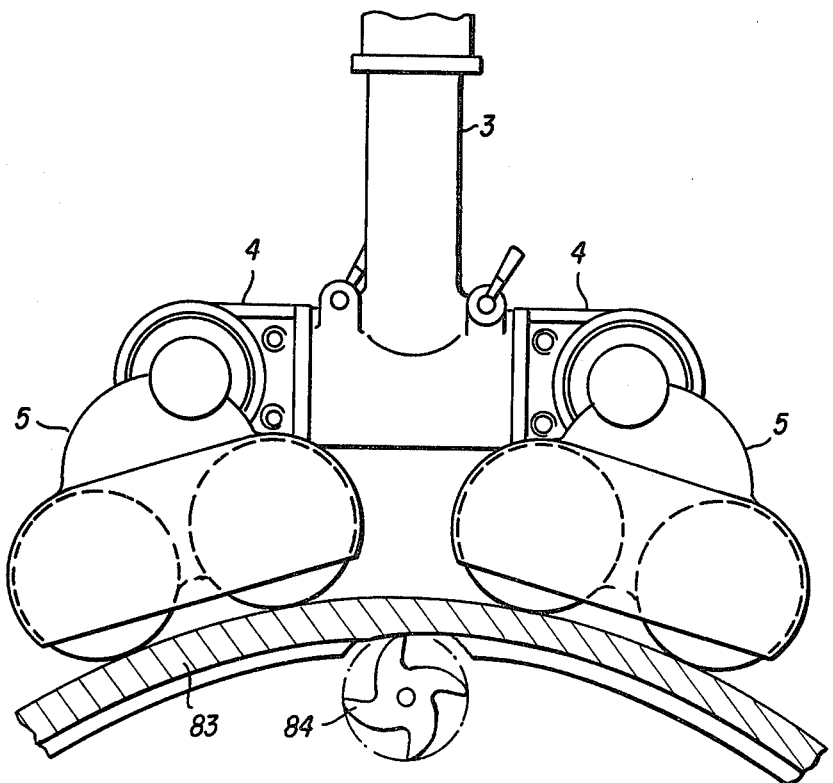
Figure 9B:
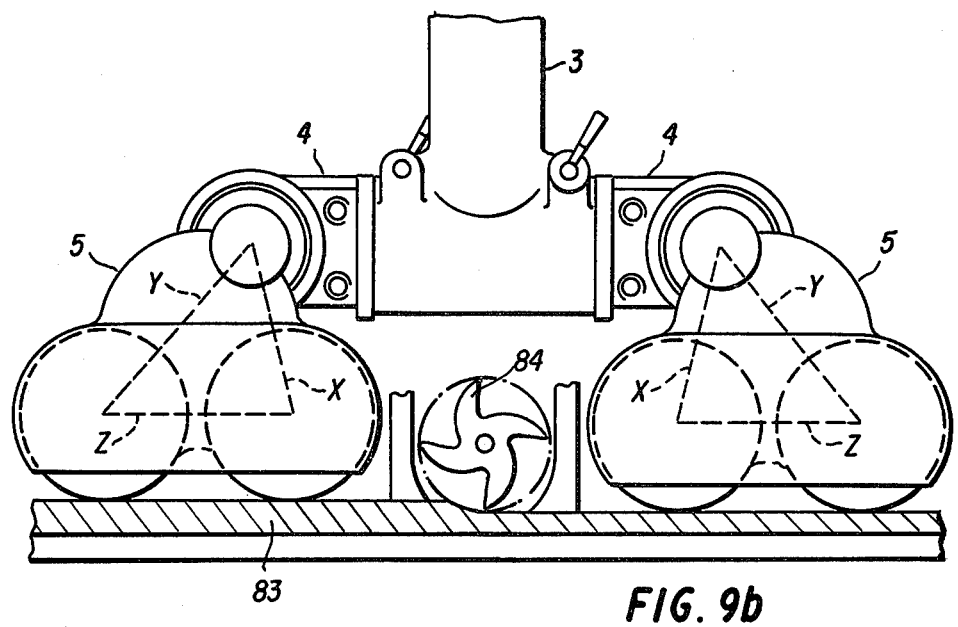
FIG. 9 illustrates another operating position of the feeding device.
Figure 9A:
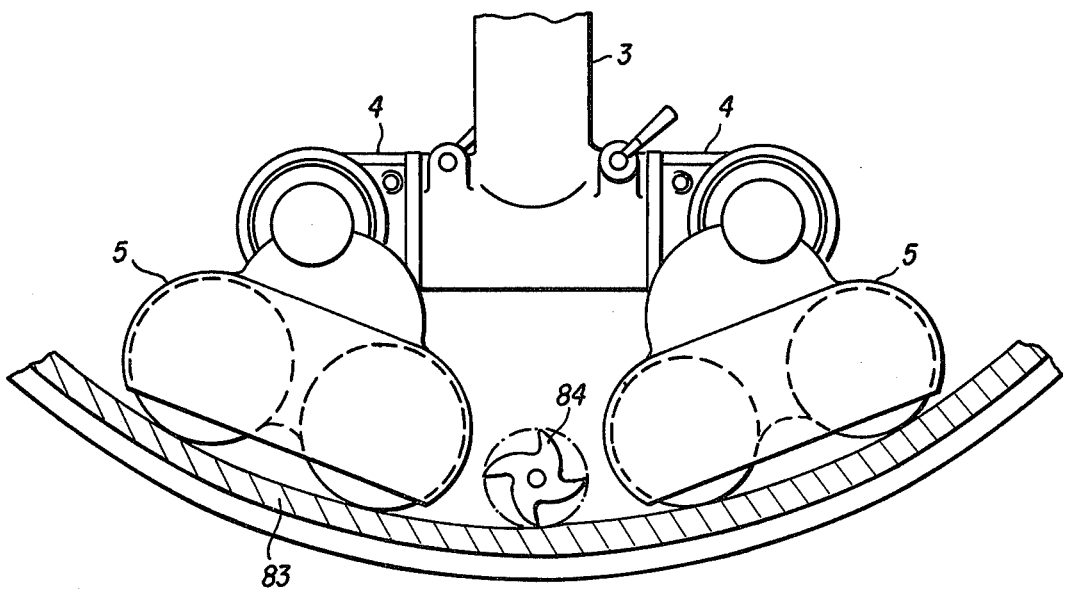

It will be appreciated that there are two rollers 60 and two rollers 61 on an axis 57 and each roller assembly 5 includes four rollers 60 and four rollers 61. Furthermore, two axes 57 are mounted to the roller support or housing 53 in such a manner that the locations of the shaft 46 and two axes 57 are at apexes of a triangle and distances of the axes 57 from the shaft 46 are not equal. Therefore, when two roller assemblies 5 are mounted on the arm portions 4 in such a manner that the axes 57 of longer distance y from the shaft 46 are positioned between the axes 57 of shorter distance x from the shaft 46, the roller assemblies 5 can be applied for a workpiece 83 of which the bottom side is to be machined as shown in FIGS. 8a and 8b. If the position of two roller assemblies 5 are interchanged as shown in FIGS. 9a and 9b, the roller assemblies 5 can be applied for a workpiece 83 of which the upper side is to be machined. It can be appreciated that this feeding device can be applied for the workpiece of either curve surface of flat surface as the roller supports 53 can be adjusted to turn about both horizontal and vertical axes, and, during operation, the cutter can work between two roller assemblies 5.

With the invention thus explained, it is apparent that obvious modifications and variations can be made without departing from the scope of the invention. It is therefore intended that the invention be limited only as indicated in the appended claims.

What I claim is:

1. A feeding device used for a wood working machine comprising:

a column;

a cantilever arm;

power means mounted on said over-arm;

a cantilever hung from said cantilever arm including, an upper portion mounted to said cantilever arm said upper portion having upper and lower sides, and steerable to turn about a vertical axis relative to said overarm, and two arm portions symmetrically extended from the lower side of said upper portion and steerable to turn about a first horizontal axes relative to said upper portion; two sets of roller assemblies respectively mounted to said arm portions, each of said roller assemblies including, a roller support connected to said arm portion and steerable to turn relative to said arm portion about a second horizontal axis perpendicular to said first horizontal axis, and at least two rows of rollers attached to said support and respectively rotatable about two third horizontal axes parallel to said second axis, said second and third axes being arranged at locations of apexes of a triangle, distances of said third axes from said second axis being unequal; and transmission elements including, spur gears, bevel gears, and shafts cooperably mounted in said head for transmitting rotational movements from said power means to said rollers.

* * * * *